UNITED STATES PATENT OFFICE.

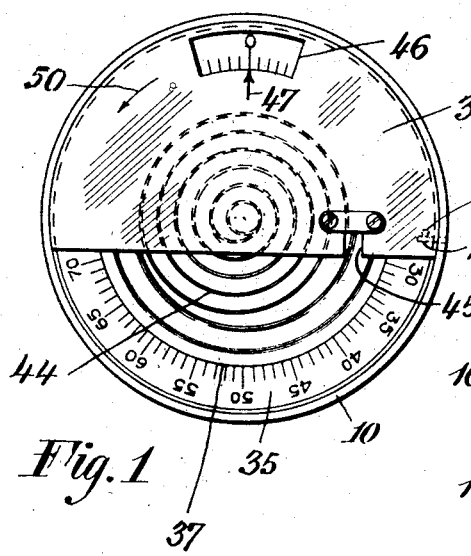
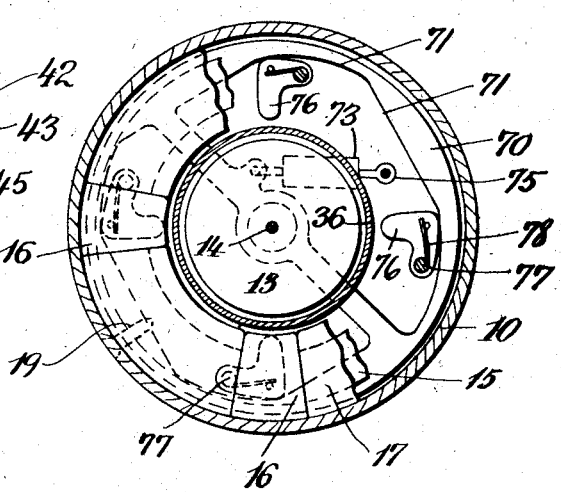
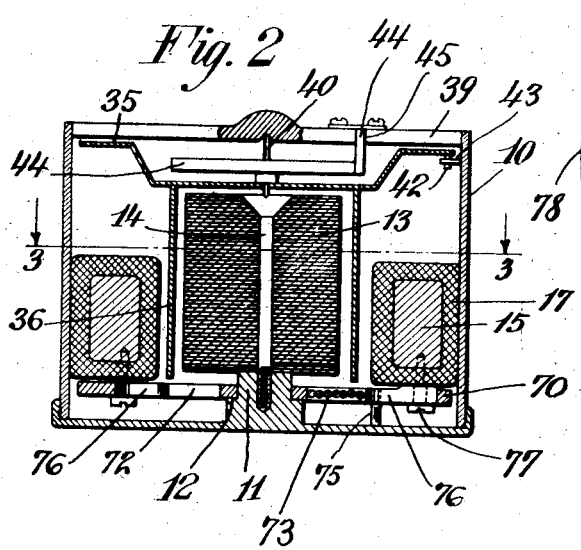
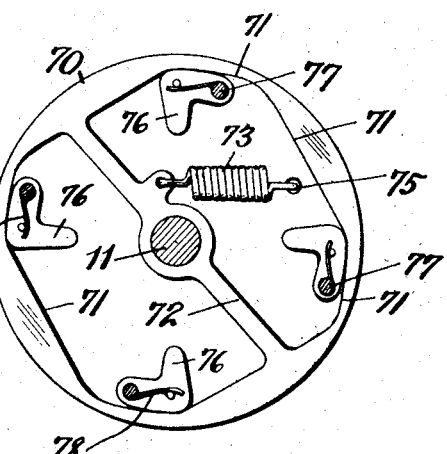

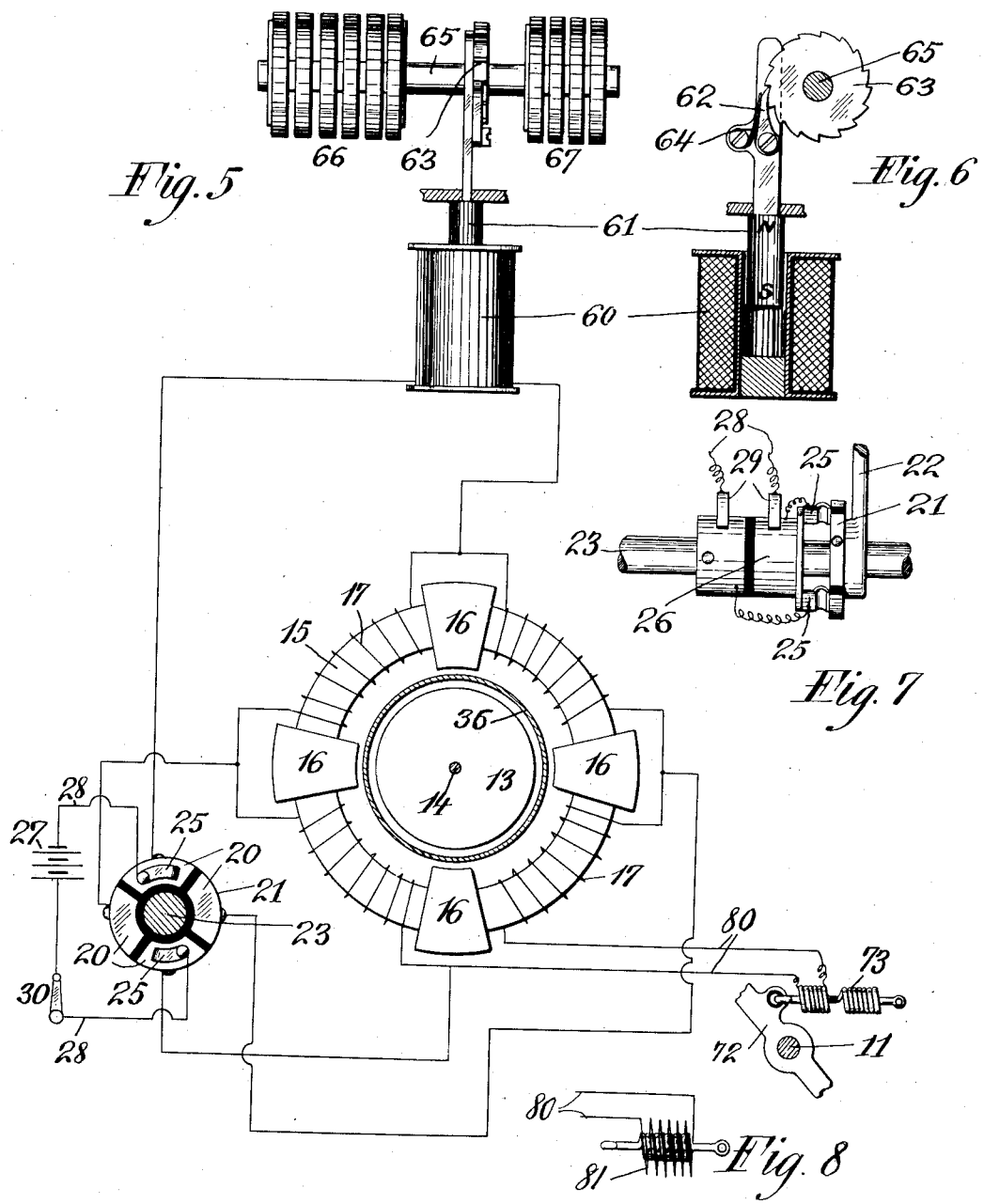

ALLEN A. CANTON, OF NEW YORK, N. Y., ASSIGNOR TO THE DEVICE TESTING COMPANY, A CORPORATION OF CONNECTICUT.

SPEEDOMETER.

1,171,021.   Specification of Letters Patent.   Patented Feb. 8, 1916.

Application filed May 25, 1914. Serial No. 840,752.

*To all whom it may concern:*

Be it known that I, ALLEN A. CANTON, a citizen of the United States of America, and a resident of the city, county, and State of New York, have invented certain new and useful Improvements in Speedometers, of which the following is a specification.

This invention relates to improvements in speedometers or speed indicating instruments, and the main object of the invention is to provide an electrically operated speedometer having but a single movable element, namely the speed indicating element.

A further object is to provide a speedometer of generally improved and simplified construction having but a few parts so arranged and operated so as to provide a highly efficient instrument adapted to be produced at a low cost of manufacture.

Another object of the invention is to provide a novel form of thermostat for automatically regulating the instrument with respect to variations in temperature.

Still other objects of the invention will appear as this specification proceeds.

The invention comprises the construction, combination, location and arrangement of parts as will hereinafter be described in detail and as shown in the accompanying drawings in which—

Figure 1 is a plan view of a speedometer embodying my invention. Fig. 2 is a substantially vertical central sectional view of the instrument. Fig. 3 is a horizontal sectional view on line 3—3 of Fig. 2 with parts broken away. Fig. 4 is a plan view of the thermostatic device. Fig. 5 is a wiring diagram. Fig. 6 is a detail view of a magnetic device for operating an odometer or similar counting device. Fig. 7 is a detail view in elevation of the commutator shown in Fig. 5, and Fig. 8 is a detail view of a thermostatic device.

It is well understood in the art of speed indicating devices that an electrically operated instrument possesses certain advantages over other devices operated mechanically. One of these advantages resides in the fact that with an electrically operated speedometer no flexible shaft or other mechanical connection is required to transmit the movement from the device, the speed of which is to be measured to the speed indicator. Another advantage is that the latter may be placed a distance away from the device, the speed of which is to be measured, because the transmission is by means of the electric current.

One particular advantage and feature of this invention is that it is so constructed that it has but one rotating part and further by the fact that the thermostatic device is of a very simple and novel form of construction.

In the drawing 10 represents a casing of suitable non-magnetic material and provided with a suitable boss 11 having an annular shoulder 12. On the boss 11 there is mounted a laminated armature 13 of soft iron by means of a screw 14 or other fastening means.

Surrounding the armature 13 there is mounted an electro-magnet comprising the core 15 and the poles 16 between which are wound the coils 17. There may be any suitable number of poles and coils. The electro-magnet may be positioned in the casing by one or more set screws 19.

The coils 17 are connected serially to the four segments 20 of a commutator 21 which is suitably secured to a bracket 22 which may form a bearing for the shaft 23 the speed of which is to be measured.

25, 25 are brushes mounted in a brush holder 26 which is secured so as to rotate with the shaft 23. The brushes are connected across the battery 27 or other source of electrical energy by the battery circuit 28. Current is supplied to the brushes by way of sliding contacts 29 in an obvious manner.

30 is a switch for controlling the battery circuit.

From the description so far and the drawing it will be clear that as the shaft 23 rotates and by means of the connections described a rotating magnetic field is produced between the armature 13 and the electro-magnet.

The indicating member 35, of aluminum or similar material is mounted to rotate between the armature 13 and the electro-magnet 15—17 so as to cut the magnetic lines of force between the latter and the armature. To this end the member 35 is provided with a skirt or cylindrical portion 36 which surrounds the armature and extends down preferably as far as or a little below the electro-magnet.

37 is a scale on the indicating member 35.

39 is a suitable cover and the pivot 40 of the member 35 has a bearing in the cover and in the armature as shown, though other arrangements may be used.

42 is a stop on the indicating member adapted to strike or take against a stop 43 in the casing.

44 is a hair spring, the inner end of which is secured to the pivot 40 and whose outer end is secured to a post 44 adjustably mounted in a slot 45 in the cover, which is provided with an opening 46 through which the scale 37 may be read with relation to a mark or pointer 47.

The rotating magnetic field produced when the shaft 23 is rotated and the battery circuit is closed imparts a rotative tendency to the indicating member in the direction of rotation of the magnetic field and in direct proportion to the rotative speed of the brushes which is equal to that of the shaft 23, such rotative tendency being opposed by the spring 44 in such a proportion with respect to the magnetic effect created by the electro-magnet as to cause the indicating member to revolve to an extent in direct proportion to the shaft 23, and hence when said scale member is properly calibrated the exact speed of the rotation of the shaft 23 will be indicated in the graduations seen through the opening 46 in the cover, which is mounted stationarily together with the casing. In the instance shown the indicating member moves in the direction of the arrow 50 in Fig. 1. When the member has made one complete revolution, the stop 42 thereon abuts the stop 43 on the casing and prevents further rotation of the member 35.

From the foregoing it will be clear that the speed of the shaft 23 may be read directly by means of the scale 38. When the instrument is to be used on an automobile for instance, in which case it is desirable to ascertain the distance traveled at a given speed, there is added to the instrument an odometer or other counting device.

An inspection of Fig. 5 shows a magnet 60 connected in series—or parallel—with the electro-magnetic circuit and provided with a polarized armature or plunger 61. During one revolution of the shaft 23 two impulses pass through the coil of the magnet in opposite directions, and as a result of which the polarized plunger is pulled positively up or down. The plunger carries a pawl 62 which is kept in engagement with a ratchet 63 by a spring 64 and is arranged as shown to operate the ratchet one step or tooth for each stroke. The ratchet is secured to a shaft 65 of a suitably constructed odometer having a mileage and a trip counter 66 and 67 respectively and diagrammatically represented, from which it will be noted that for each revolution of the shaft 23—which may represent one of the wheel shafts of a vehicle—the plunger 61 is pulled upwardly and the ratchet, hence the counting device, is operated one tooth. In other words, the counting devices are operated by a magnetically actuated plunger so that the odometer is operated one step for each two impulses in the electro-magnetic circuit or for each revolution of the shaft the speed of which is to be measured.

Thermostatic means are provided to automatically regulate the instrument with respect to temperature changes in the apparatus and of resistance in the circuit. To this end there is provided a member adapted to move in response to temperature changes and which operate other means for varying the magnetic field between the electro-magnet and the armature.

Referring to Figs. 2 to 4 the numeral 70 represents a ring member having cam surfaces 71 and a diametrically disposed supporting bar 72 by means of which the ring 70 is rotatably supported on the shoulder 12 of the boss 11 mentioned above. 75 is a post fixed to the casing 10 and between the post and the bar 72 there is mounted a thermostat in the form of a flat coil of expansion metal 73, which may be bi-metallic or a composition of metal whose coefficient of expansion is definitely known and suitable for the purpose. 76, 76 represent movable pole pieces in the form of bell cranks pivoted to the electro-magnet at 77 and kept in contact with the ring 70 by springs 78. The pole pieces 76 are located immediately beneath the poles of the electro-magnet.

A change in temperature causes expansion or contraction of the thermostat which operates the ring member 70 to move the pole pieces 76 either inwardly to weaken or outwardly to strengthen the magnetic field between the electro-magnet and the armature by reason of a smaller or greater leak of the magnetic lines or force beneath the skirt or cylinder 36 of the scale member.

In order to compensate for variations in the voltage of the current irrespective of temperature variations the thermostat may be included serially in the electro-magnet circuit as shown in Fig. 5 in which a portion of the thermostat 73 is connected to the circuit by wires 80. A portion of the thermostat or all of it may be included in the circuit. A modification is shown in Fig. 8 in which 81 is a heating coil wound around the thermostat whereby to cause the latter to operate in response to variations in the voltage in the circuit.

The form of thermostatic device illustrated and described possesses the advantages that it may be made sturdy, is easily regulated and secured in position. It will also be noted that the thermostat does not directly operate any of the parts of the speedometer mechanism proper, but operates to vary the strength of the magnetic flux by providing an additional path for it.

The details of construction may be varied within the principle of the invention and the scope of the appended claims.

I claim:—

1. A speedometer comprising an electromagnetic member wound to provide a rotating magnetic field, an indicator member in inductive relation thereto, an armature, thermostatic means for varying the magnetic flux through said indicator member and comprising movable pole pieces for providing a path for the magnetic flux around said indicator member and means for operating the said movable pole pieces.

2. A speedometer comprising an electromagnetic member wound to provide a rotating magnetic field, an indicator member in inductive relation thereto, an armature, movable pole pieces supported on said electro-magnetic member and thermostatic means for operating said pole pieces whereby to provide a path for the magnetic flux around said indicator member to compensate for temperature changes of resistance in the circuit of said electro-magnetic member and means for supplying electric current to said electro-magnetic member.

3. A speedometer comprising an electromagnet wound to provide a rotating magnetic field, an indicator in inductive relation thereto, an armature, movable pole pieces supported on said electro-magnet, means for operating said pole pieces, a thermostat for actuating the said means and means for supplying electric current to the said electro-magnet.

Signed at New York, N. Y., this 20th day of May, 1914.

ALLEN A. CANTON.

Witnesses:
IVAN KONIGSBERG,
WALTER S. MORTON.